Patented Feb. 25, 1930

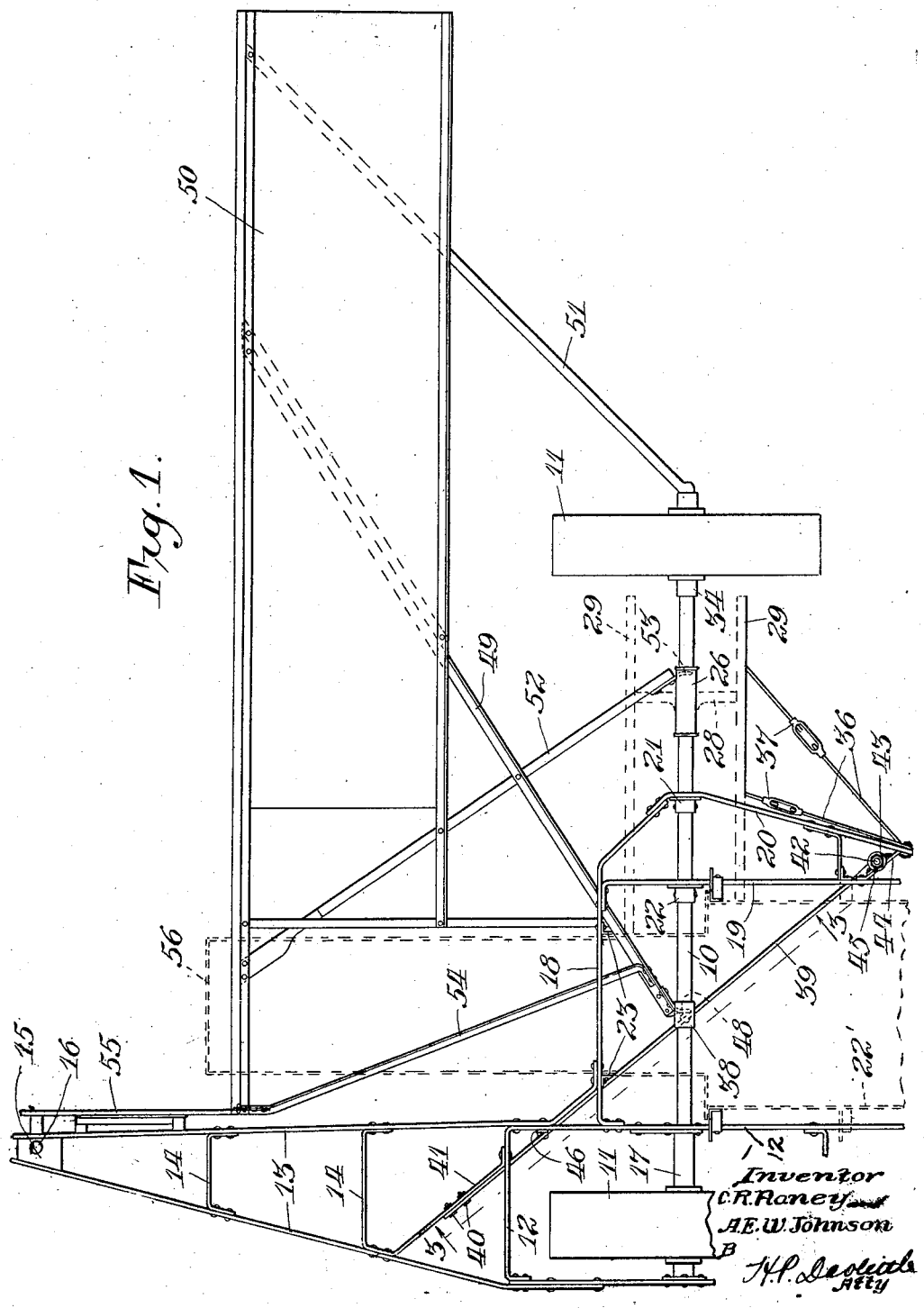

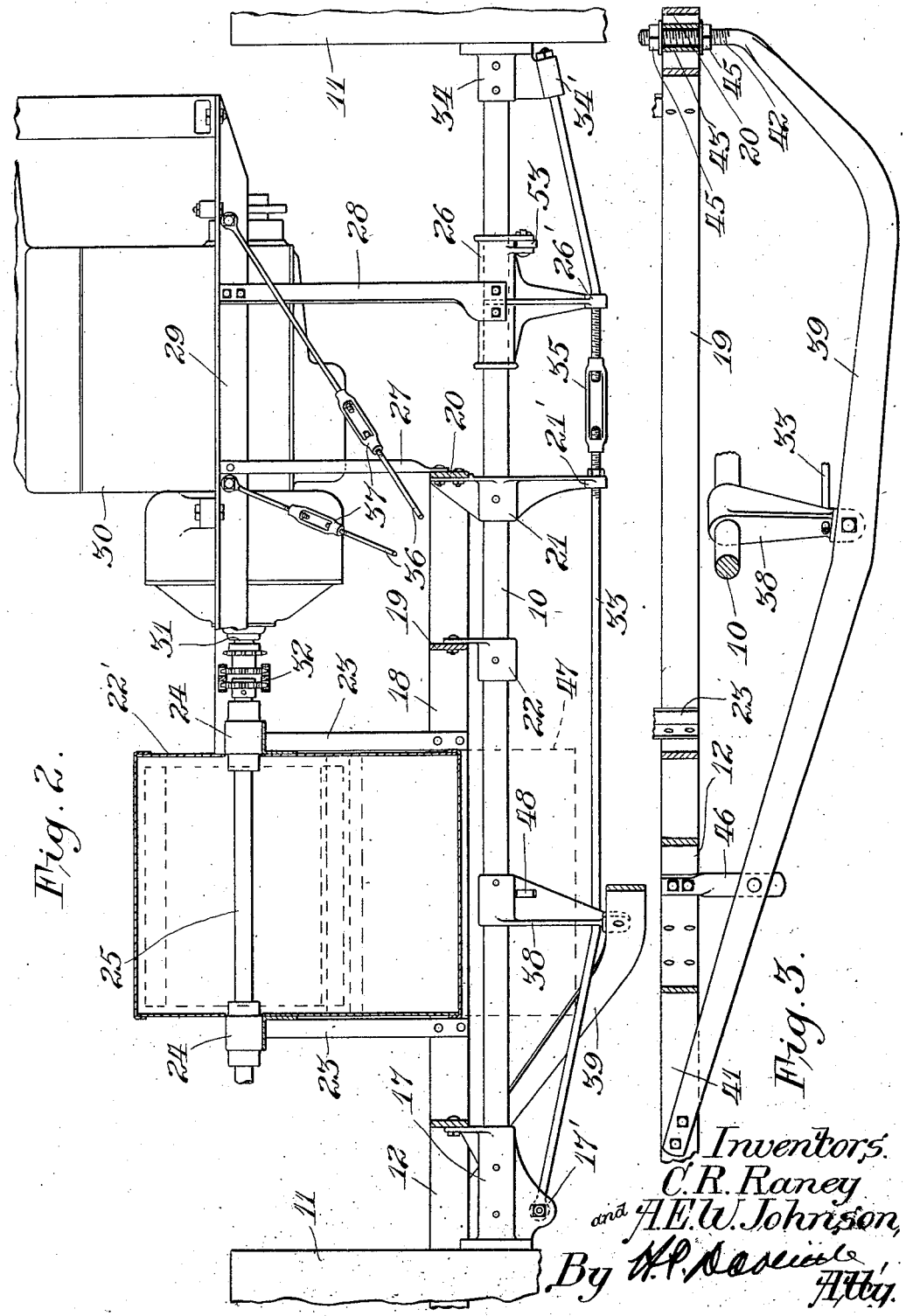

1,748,559

UNITED STATES PATENT OFFICE

CLEMMA R. RANEY, OF RIVERSIDE, AND ARNOLD E. W. JOHNSON, OF CHICAGO, ILLINOIS, ASSIGNORS TO INTERNATIONAL HARVESTER COMPANY, OF CHICAGO, ILLINOIS, A CORPORATION OF NEW JERSEY

LEVELING AND ALIGNING DEVICE FOR HARVESTER THRASHERS

Application filed January 21, 1926. Serial No. 82,691.

The present invention pertains to combined harvesters and thrashers and particularly to an improved frame construction therefor embodying novel leveling and aligning devices for the supporting frame and various operative parts disposed thereon.

Present known harvester thrashers are cumbersome and large and necessarily, therefore, must have a heavy frame structure. Furthermore, due to the great strains encountered in using these machines, various parts thereof will become forced out of true, which, almost needless to say, is decidedly objectionable, as this seriously affects the efficient operation of such machines.

The primary object therefore is to provide means for overcoming any tendency to disalignment of parts and warping or sagging of the frame structure, and in this manner, materially lighten the machine without sacrificing strength or rigidity.

More specific objects are to provide in a machine of this type means for preventing sagging of the main carrying axle; to provide means for insuring proper alignment of the engine and thrashing cylinder shafts; and to provide means for leveling the thrashing mechanism.

These very desirable objects are accomplished in the provision of the strengthening and adjustable trussing elements hereinafter to be disclosed and specifically described.

In this connection reference is to be made to the accompanying sheets of drawings, like reference characters denoting like parts throughout the several views, and wherein:

Fig. 1 is a plan view of a harvester thrasher, with the superstructure removed, clearly to illustrate the frame;

Fig. 2 is a fragmentary rear elevational view; and

Fig. 3 is an elevation of the thrasher leveling means of Fig. 1, when viewed along the line 3—3 of said figure.

The machine is carried on a frame comprising a stationary frame part and a relatively movable frame part. This frame structure is supported on the carrying axle 10 which is carried by wheels 11. The stationary frame part is disposed on the stubbleward side of the machine and comprises a rectangular frame section indicated generally at 12. A pair of converging frame bars 13 extends forwardly from this frame section, the same being suitably cross braced as by means of bars 14, the converging forward ends having arranged in the angle at their point of convergence a block 15, which receives a spindle 16 for mounting a pilot wheel truck (not shown). Thus, the front end of the stationary frame part will be supported by this wheel truck, not shown. A bracket 17, fast on the axle 10, rigidly supports the frame 12.

Extending grainwardly from one of the frame bars 12 and fastened thereto is a bar 18 which, combined with rearwardly extending bars 19 and 20, forms the thrasher supporting frame, the bar 20 being secured to a bracket 21 and the bar 19 on a bracket 22, both carrried on the axle 10. The thrasher or separating housing supported on this frame structure is indicated generally in Fig. 1 at 22'.

The cross bar 18 is provided with upright standards 23 (Fig. 2) which carry bearing boxes 24 for journaling the rotatable thrashing cylinder shaft 25, disposed laterally with respect to the line of draft of the machine and above and in parallel with respect to the axle 10.

Further along the axle at its grainward end is another bracket 26, there being other uprights 27, 28, extending respectively from brackets 21, 26. These uprights carry horizontally disposed spaced sills 29, on which is carried an engine 30, the crank shaft 31 of which is coaxial and in line with the cylinder shaft 25, the two shafts being flexibly coupled by a flexible joint 32.

It will thus be seen that the engine, separating mechanism and frame structure so far described are all rigid and find their support on the axle 10. Due to the weight of these parts the axle might sag and become warped, which would seriously affect the operation of the thrashing cylinder, because both the cylinder and engine shafts would be thrown out of alignment. Such sagging of the axle, should it occur, can readily be overcome in the provision of the now to be described mechanism.

It will be observed that the brackets 17, 21 and 26 all have a depending eye part indicated at 17', 21' and 26' (see Fig. 2) and that a rod 33 loosely passes through these eye parts. The stubbleward end of this rod is made fast to the eye 17' in the bracket 17 by means of a bolt, while the other end passes through and is similarly secured to an eye 34' in a bracket 34 fast on the axle 10. The rod 33 is broken intermediately of its ends to receive a turn buckle 35 by means of which the rod can be tensioned to spring the axle back in place, should it sag. In this mechanism there is thus provided a means for maintaining the frame rigid and the cylinder and engine shafts in vertical alignment.

However, due to strains, these shafts may become out of line in a horizontal, or fore and aft direction, and a means has also been provided to correct such difficulty. The two rods 36, each provided with a turn buckle 37, are secured at one end to the frame bar 20 and at their other ends, spaced apart, to the rear sill 29 which supports the engine. By manipulating the turn buckles the supporting structure for the engine can be sprung to align the engine shaft 31 in a fore and aft direction with respect to the thrashing cylinder shaft. It will now be appreciated that the rod 33 and its turn buckle 35 with the tie rods 36 and their turn buckles 37 provide a co-operative means for aligning the engine and cylinder shafts up and down and fore and aft, thereby insuring efficient operation of the thrashing cylinder.

At times, due to weight and stresses, the separating or thrashing mechanism, generally shown at 22', supported on the axle and located between the brackets 17 and 22 might sag. Thus, a condition is created where the separating mechanism is not level, and such a situation obviously will make for poor thrashing. Means has, therefore, been provided, in accordance with a stated object of this invention, to level the separating mechanism, under such circumstances.

Secured fast to the axle 10, about midway between the brackets 17 and 22, and depending downwardly therefrom, is a bracket 38. This bracket has connected rigidly thereto a heavy bar 39 which is diagonally disposed below the frame of the machine, and having its forward end rigidly secured, by means of suitable bolts 40, to a brace bar 41. The opposite, or rear end of this bar is formed into a threaded shank 42, which passes through a sleeve 43, fastened to a brace 44, connecting the bars 19 and 20. By means of nuts 45 the bar 39 may be raised or lowered as will be readily understood. A short upright bar 46 connects the bar 39 and frame section 12, as shown. There is thus provided a means for springing upwardly the axle 10 directly through the bracket 38, and the frame section 12 directly through the upright bar 46. Also, the entire stationary frame described is indirectly sprung upwardly upon manipulation of the nuts 45 because the axle is sprung by the bracket 38, the axle, it being remembered, supporting the entire frame through the brackets 17, 22, 21 and 26. It will be noted that the rod 33 passes through the bracket 38 (see Fig. 3).

Of course, as is conventional in these machines, a blower housing projects below the frame structure, from the separating mechanism. This is indicated diagrammatically at 47 in Fig. 2. Should the machine travel over hollows the blower housing is apt to strike the ground and become injured. By placing the bar 39, as applicants have done, below this housing, a very effective means is provided for protecting this blower housing from the injury described.

There yet remains to be described the movable frame heretofore mentioned which constitutes the harvester cutting and conveying platform support.

Pivoted to the bracket 38, at 48, is a forwardly and grainwardly extending frame member 49, which extends below and is secured to the frame members of a platform 50. A second, similarly disposed frame member 51 is pivotally secured on the axle 10 at the outer end of the grainward wheel 11. Another frame member 52 is similarly pivoted to the bracket 26 at 53 and crosses the bar 49, and is fastened thereto and to the platform 50, as shown. Still another bar 54 made fast to the bar 49 extends forwardly and connects with the forward stubbleward corner of the platform 50. It will now be seen that the entire platform 50, because of the pivotal connection of its frame supporting members, may be adjusted up or down around the axle 10 as an axis of rotation. A lever mechanism, indicated generally at 55, serves to perform this adjusting function. The feeder housing for the separating mechanism 22' is diagrammatically shown at 56.

Summarizing the operation of this improved machine, it will be seen; that in the rod 33 the axle 10 can be sprung into proper place, which results in proper alignment of the engine and thrashing cylinder shafts in an up and down direction; that in the adjustable rods 36 there is a co-operable means for springing the engine supporting frame and, of course, the engine shaft in a fore and aft direction relative to the thrashing cylinder shaft; and, lastly, that in the bar 39 both the axle 10 and entire frame can be sprung upwardly to level the separating mechanism, the same bar also affording protection against injury to the blower housing.

It should be understood, of course, that only an illustrative embodiment of this invention has been shown, and that the same is susceptible of change and modification within the skill of a mechanic, without departing from the spirit and scope of this invention, as defined in the subjoined claims.

We claim:

1. In a combined harvester and thrasher, the combination of an axle and spaced carrying wheels, frame structures mounted on the axle including co-axially aligned thrashing cylinder and engine crank shafts, and means for springing the axle to align said shafts should the same be thrown out of alignment.

2. The combination with a harvester thrasher having a frame supporting a thrashing cylinder and an engine, of means for aligning the shafts of the cylinder and engine in both a fore and aft and an up and down direction with respect to each other, the shafts being normally co-axial and flexibly connected.

3. In a combined harvester and thrasher, the combination of an axle and carrying wheels, frame structures mounted on the axle including co-axially aligned thrashing cylinder and engine crank shafts, means for springing the axle for aligning said shafts in an up and down direction, and additional means for aligning the engine shaft in a fore and aft direction with respect to the cylinder shaft.

4. In a combined harvester and thrasher, the combination of an axle and carrying wheels, a frame structure on the axle supporting a thrashing cylinder shaft, a second frame structure on the axle supporting an engine including a crank shaft co-axial with the cylinder shaft, and means for springing said second frame structure to align the engine shaft in a fore and aft direction with respect to the cylinder shaft.

5. In a combined harveser and thrasher, the combination of an axle and carrying wheels, a frame structure supporting a thrashing mechanism including a cylinder shaft on the axle, a second frame structure on the axle supporting an engine including a crank shaft co-axial with the cylinder shaft, means connected to the axle for springing it to align the engine and cylinder shafts in an up and down direction, and additional means for springing the second frame to align the engine shaft with respect to the cylinder shaft in a fore and aft direction.

6. In a combined harvester and thrasher, the combination of a main frame, a frame thereon supporting a thrashing mechanism including a cylinder shaft, a second frame thereon supporting an engine including a crank shaft in co-axial alignment and flexibly connected with the cylinder shaft, means for springing the main frame to align the shafts in an up and down direction, and means connected to the main and second frames for springing the second frame to align the engine shaft in a force and aft direction with respect to the cylinder shaft.

7. In a harvester thrasher, the combination of a main stationary frame and a supplemental relatively adjustable frame, both frames carried on the main axle of the machine, and means carried by and extending diagonally beneath the main frame for springing the frame upwardly should the same sag.

8. In a harvester thrasher, the combination of a main frame, thrashing mechanism thereon, and adjustable means connected with and extending beneath the main frame for springing it to level the thrashing mechanism.

9. In a harvester thrasher, the combination of an axle and wheel supported main frame, thrashing mechanism carried on the frame, a bar fastened at one end to the frame and at the other end adjustably mounted on the frame, members on said bar connecting it to the main frame and axle, whereby upon adjustment of the adjustable end of the bar the axle and main frame may be sprung to level the thrashing mechanism.

10. In a harvester thrasher, the combination of an axle and wheel supported main frame, thrashing mechanism carried on the frame, a bar connecting the front and rear parts of the frame and extending diagonally therebeneath, and means for adjusting said bar to spring the frame for leveling the thrashing mechanism.

11. In a harvester thrasher, the combination of an axle and wheel supported main frame, thrashing mechanism carried on the frame, a bar connecting the front and rear parts of the frame and extending diagonally therebeneath, means connecting said bar with the axle and the main frame at points intermediately of the ends of the bar, and means for adjusting said bar to spring the frame and axle for leveling the frame and thrashing mechanism.

12. In a harvester thrasher, the combination of a main frame, a thrasher part thereon including a depending housing arranged beneath the main frame, and a diagonally disposed, downwardly curved, brace bar connecting front and rear points of the main frame and extending underneath said depending housing.

In testimony whereof we affix our signatures.

CLEMMA R. RANEY.
ARNOLD E. W. JOHNSON.